US005191517A

United States Patent [19]

Stephenson

[11] Patent Number: 5,191,517

[45] Date of Patent: Mar. 2, 1993

[54] ELECTROSTATIC PARTICLE ACCELERATOR HAVING LINEAR AXIAL AND RADIAL FIELDS

[75] Inventor: Kenneth E. Stephenson, Newtown, Conn.

[73] Assignee: Schlumberger Technology Corporation, New York, N.Y.

[21] Appl. No.: 568,924

[22] Filed: Aug. 17, 1990

[51] Int. Cl.[5] .............. H02M 7/25

[52] U.S. Cl. .............. 363/59; 361/329

[58] Field of Search .............. 363/59, 60, 61; 361/320, 321, 321 T, 328, 329, 330; 315/111.01

[56] References Cited

U.S. PATENT DOCUMENTS

| | | | |
|---|---|---|---|
| 3,581,106 | 5/1971 | Peoples et al. | 307/150 |
| 3,602,827 | 8/1971 | Peoples et al. | 328/233 |
| 3,614,588 | 10/1971 | Davies | 321/8 R |
| 3,627,906 | 12/1971 | Kurz et al. | 174/143 |
| 3,900,788 | 8/1975 | Behn | 321/15 |
| 3,902,108 | 8/1975 | Sion | 321/15 |
| 4,298,902 | 11/1981 | Weigel et al. | 361/328 |
| 4,320,446 | 3/1982 | Langford et al. | 363/59 |
| 4,389,703 | 6/1983 | Morel | 363/61 |
| 4,583,025 | 4/1986 | Adler et al. | 315/4 |
| 4,587,430 | 5/1986 | Adler | 250/423 |
| 4,918,325 | 4/1990 | Busby et al. | 307/106 |

FOREIGN PATENT DOCUMENTS

| | | | |
|---|---|---|---|
| 2526823 | 6/1975 | Fed. Rep. of Germany | 363/61 |
| 61-208739 | 9/1986 | Japan . | |
| 62-166782 | 7/1987 | Japan . | |
| 62-166783 | 7/1987 | Japan . | |

OTHER PUBLICATIONS

D. A. Bromley, "The development of electrostatic accelerators," *Nuclear Instruments and Methods,* 122 (1974), pp. 1-34.

M. M. A. Salama et al., "Design of Field-Controlled Multi-Layer Insulation System," *IEEE Transactions on Electrical Insulation,* vol. EI-21, No. 2, Apr. 1986, pp. 165-174.

D. Kind, "High-Voltage Insulation Technology: Textbook for Electrical Engineers," Friedr. Vieweg & Sohn, 1985 pp. 120-121.

*Primary Examiner*—Steven L. Stephan
*Assistant Examiner*—Adolf Berhane
*Attorney, Agent, or Firm*—Leonard W. Pojunas

[57] ABSTRACT

A particle accelerator comprises a Cockcroft-Walton voltage multiplier that provides linear axial and radial fields. The Cockcroft-Walton voltage multiplier includes capacitors that are arranged radially relative to one another, such that a linear voltage increase occurs between the capacitors. The particle accelerator is made by placing conductive foils on an insulating sheet, connecting the foils as a Cockcroft-Walton voltage multiplier, and rolling the insulating sheet with the foils into a cylinder to form the radially arranged capacitors.

7 Claims, 6 Drawing Sheets

ELECTROSTATIC PARTICLE ACCELERATOR HAVING LINEAR AXIAL AND RADIAL FIELDS

FIELD OF THE INVENTION

The invention concerns an electrostatic particle accelerator. More specifically, the invention concerns a particle accelerator having a radially arranged Cockcroft-Walton voltage multiplier.

BACKGROUND OF THE INVENTION

Charged particle accelerators used in oil-well logging generally produce secondary beams of uncharged particles, such as neutrons and photons, which effectively penetrate the borehole formation. For example, FIG. 1 shows a schematic diagram of a prior art neutron generator 10. The neutron generator 10 comprises a metal pressure vessel 12 that houses a Cockcroft-Walton (C-W) voltage multiplier 14. The C-W multiplier comprises a circuit of discrete elements that are hard wired together in a ladder circuit. The C-W multiplier is powered by a voltage supply 16 that energizes a transformer 18 within the metal pressure vessel 12. The C-W multiplier 14 multiplies the power from the transformer 18 as described below concerning FIGS. 2 and 3. The output of the C-W multiplier 14 biases the ring 20 of an acceleration tube 22 and an ion target 24. Thus, ions from an ion source 26 are accelerated toward the target 24 in a known manner. A resistor 28 protects the acceleration tube 22 from current surges.

FIG. 2 illustrates a two stage Cockcroft-Walton voltage multiplier. The Cockcroft-Walton voltage multiplier 14 essentially consists of an oscillating voltage drive source 16 (not necessarily sinusoidal), two series capacitor banks 30, 32, and a diode matrix 34 which interconnects the capacitors. Capacitors C1 and C3 represent an AC capacitive bank 30 and capacitors C2 and C4 represent a DC capacitive bank 32. Diodes D1 through D4 are high voltage rectifiers. On positive peaks of the source voltage, diodes D1 and D3 conduct and D2 and D4 are reverse biased (off). At this time, capacitors C1 and C3 are charged. On negative voltage peaks D1 and D3 are off and D2 and D4 conduct, charging C2 and C4.

FIG. 3 shows a PSpice simulation of the circuit of FIG. 2. All components are assumed to be ideal. The circuit is excited by the 15 kV peak-voltage sinusoidal source, with a 1 ohm source impedance 36. Current through a 12MΩ load resistor 28 is approximately 5 mA. Voltage traces from points V(1) through V(5) referenced to ground are shown. The cycle of FIG. 3 occurs after charging transients have subsided. Trace V(1) is the ladder excitation voltage. At time A of FIG. 3, diodes D2 and D4 are reverse biased (off) and diodes D1 and D3 begin to conduct. While current is flowing through D1 into C1, point V(2) is at a voltage extremum of zero. The voltage at V(3) is also at an extremum and is equal to V(4). As soon as the source reaches its peak voltage, current ceases to flow through D1 and D3. From this point until time B, all diodes are reversed biased and no charge flows between capacitor banks. Charge continues to bleed off from C2 and C4 though the load resistor 28, causing voltages V(4) and V(5) to droop. Also at time B, diodes D2 and D4 begin to conduct, transferring charge from capacitors C1 and C3 to C2 and C4. Charging continues until the source reaches its peak negative voltage at time C. On each half cycle of the voltage signal, the resulting charge is ratcheted up successive stages of the ladder to the acceleration tube 22.

FIG. 3 illustrates that all nodes on the AC capacitor bank 30 have an oscillatory component essentially equal to that of the source 16. The large ripple is one reason that the AC bank 30 is unsuitable to use for voltage grading around the acceleration tube 22. A more important reason for not attaching an acceleration tube to the AC bank 30 is the loss in ladder charging efficiency due to stray capacitances from the AC bank to ground. Stray capacitances from the DC bank 32 to ground actually aid charging efficiency.

Such an arrangement, however, results in a nonlinear field, especially at the end of the ladder toward the resistor 28. Any given dielectric is used optimally in a linear field, because all parts of the dielectric are stressed equally. At very high field strengths, electrostatic forces can reduce electrode spacing by deforming the dielectric, leading to breakdown. The problem is particularly severe in geometries where the dielectric is not constrained mechanically in all three dimensions. A major obstacle to increased neutron output, however, has been high voltage discharge within the neutron tube and in the surrounding insulation. Higher neutron output may be achieved through increased beam current but this has the disadvantages of decreased target lifetime and higher target power dissipation. The C-W multiplier 14 of the neutron generator 10 produces a radial field that is nonlinear, because the field is a function of the inverse of the radius.

Voltage dividers with one or two intermediate electrodes have been used in Van de Graaff accelerators to approximately linearize a radial field. The voltage dividers are, however, driven by a resistive voltage divider. Van de Graaff accelerators also use resistive voltage dividers to linearize the axial field. Single capacitive voltage dividers have been used to linearize radial fields to some degree in high voltage cable terminations. These capacitive dividers comprise single, passive (non-driven) dividers.

SUMMARY OF THE INVENTION

One embodiment of the invention concerns an apparatus having a particle source, a voltage supply and a Cockcroft-Walton voltage multiplier. The voltage multiplier multiplies the voltage signal and includes a bank of capacitors arranged radially relative to one another. A linear voltage increase occurs between the capacitors. The apparatus also includes an acceleration tube that is biased by the multiplied voltage.

The invention also concerns a method of making a particle accelerator. The steps comprise placing conductive foils on an insulating sheet, connecting the foils in a C-W circuit, rolling the sheet with the foils into a cylinder, such that the foils and insulating sheet form capacitors arranged radially, relative to one another.

ADVANTAGES

The particle accelerator of this invention has linear axial and linear radial fields and provides higher voltages. When the acceleration tube of the particle accelerator is equipped with a conventional ion source and target appropriate for neutron generation, higher neutron fluxes are obtained. Alternatively, when the acceleration tube is equipped with an electron gun and target appropriate for bremsstrahlung photon production, higher photon fluxes are obtained. With higher neutron fluxes, environmental effects can be reduced because of increased source to detector spacings; safety can be improved because isotopic neutron sources can be replaced; and statistical precision or logging speed can be improved. Similar advantages apply to photon production. The particle accelerator of this invention is able to fit in a borehole for logging a formation. In a geometry of concentric coaxial cylinders the dielectric is very well constrained and electromechanical breakdown is not an important failure mechanism. The radial geometry of the capacitor banks provides very low stray capacitance from the AC side to ground or to the DC side of the generator.

DETAILED DESCRIPTION

Figure 4:
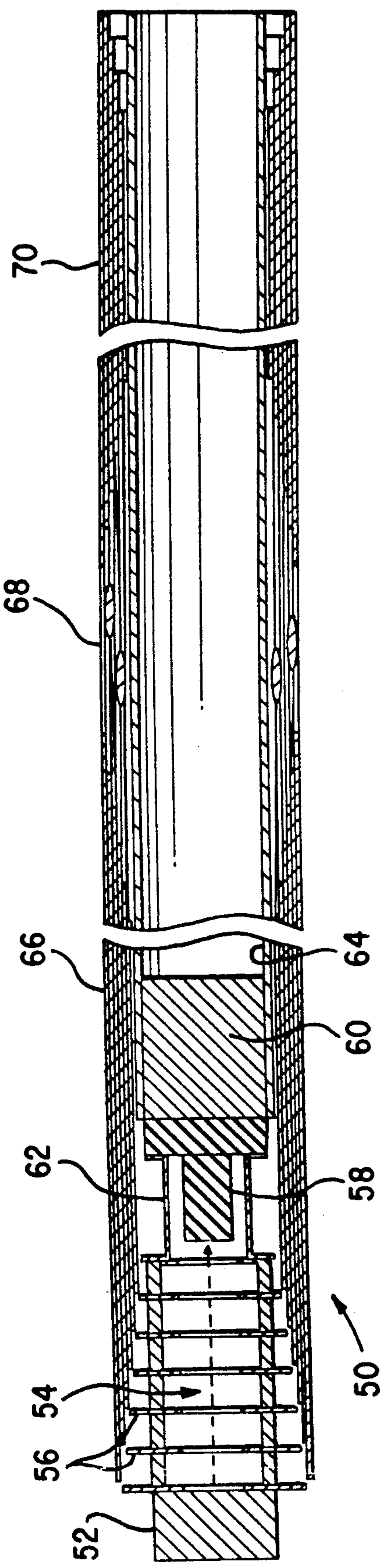
FIG. 4 is a schematic diagram of a particle accelerator according to this invention.

FIG. 4 is a schematic diagram of a particle accelerator 50 according to this invention. A particle source 52, such as an ion source, generates particles axially toward an acceleration tube 54. Increasing voltage at successive rings 56 of the acceleration tube 54 accelerate the particles toward a target 58. A brass plug 60 connects through a bracket 62 to the acceleration tube 54 behind the target 58 and closes a non-conductive tube 64. The non-conductive tube 64 contains a coolant for the target 58, such as Fluorinert. The non-conductive tube 64 also provides support for the particle accelerator 50 of this invention, as described below. Surrounding the non-conductive tube 58 is a layered DC capacitive bank 66, a diode matrix 68, and layered AC capacitor bank 70. The DC capacitor bank 66 connects to ground. The DC capacitor bank 66 connects from an outside foil (not shown) to one side of a transformer (not shown) and to ground. The AC capacitor bank 70 connects from an outside foil (not shown) to the other side of transformer (not shown). The DC and AC capacitive banks 66, 70 and the diodes 68 are electrically connected in the manner of a C-W multiplier.

Figure 1:
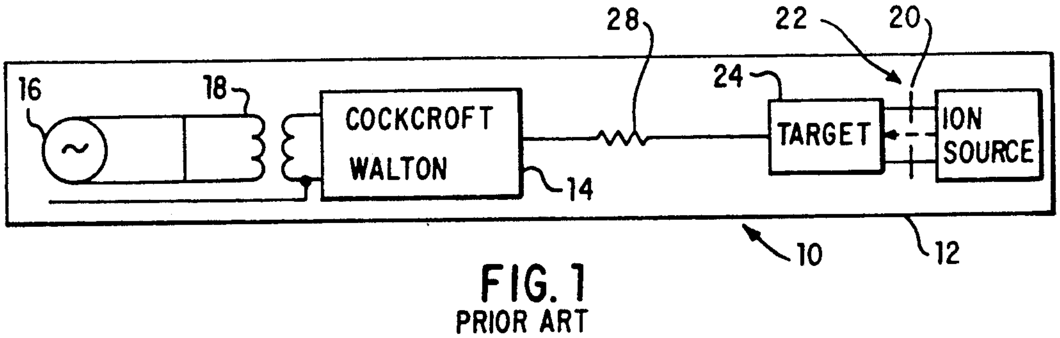
FIG. 1 PRIOR ART
FIG. 1 is a schematic diagram of a prior art neutron generator.
Figure 2:
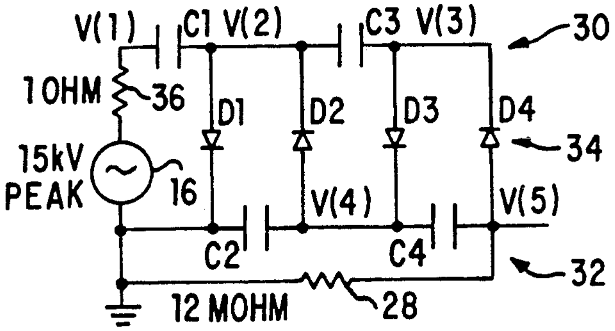
FIG. 2 PRIOR ART
FIG. 2 is a schematic diagram of a Cockcroft-Walton voltage multiplier.
Figure 3:
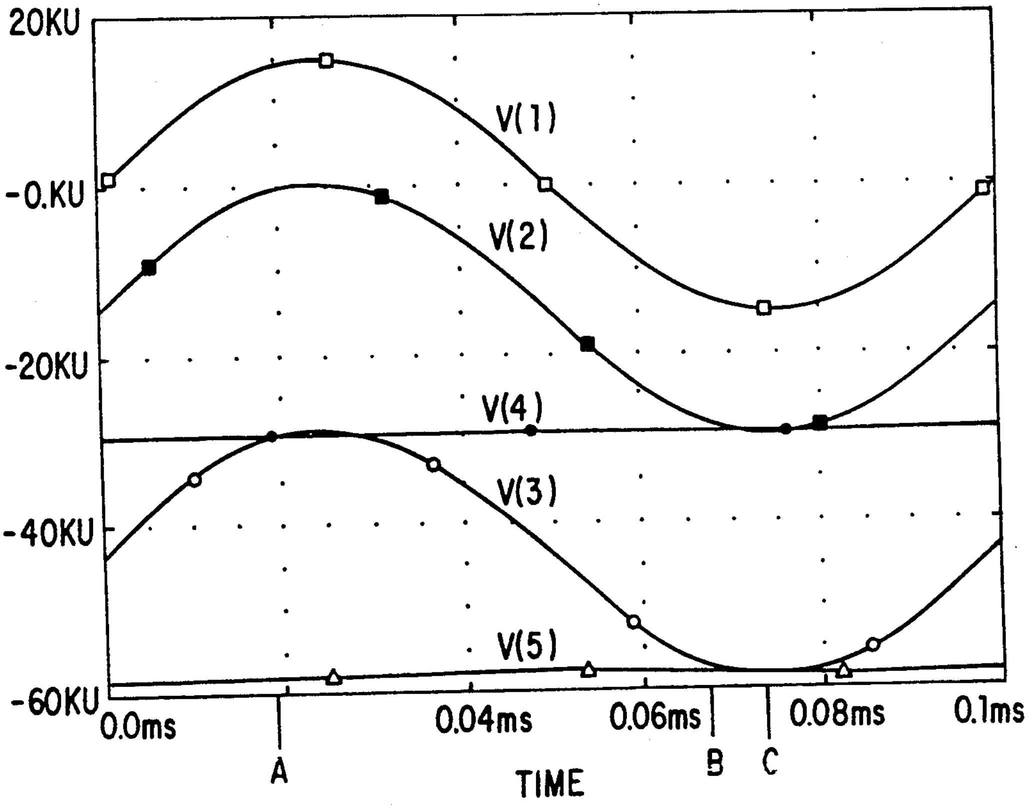
FIG. 3 PRIOR ART
FIG. 3 illustrates voltage levels of elements of the multiplier of FIG. 2.

However, according to this invention, the capacitors of each bank 66, 70 are arranged radially relative to one another. This arrangement provides a particle accelerator 50 having linear voltage increases in the axial and radial directions. The axial direction follows the beam of accelerated particles. The radial direction is perpendicular to the axial direction. According to this invention, the voltage exterior to the device is no greater than the signal voltage. A linear voltage increase occurs between stages of the acceleration tube 54 due to the equal spacing of the rings 56 that comprise the acceleration tube 54 and the equal bias voltages that are applied to the rings 56. A linear voltage increase occurs between capacitive stages of the capacitor bank 66 due to the set sizes of the capacitors, which are determined according to the radial placement and, thus circumferential area, of a particular capacitor. There is an equal dielectric thickness for each capacitive stage. For an unloaded ladder, voltage increase is two times the peak voltage of the transformer per stage, which is independent of capacitor size. An additional feature of this invention is that essentially all stray capacitance from the AC side to ground is lumped in the first, lowest voltage capacitor stage. Capacitance to ground from higher voltage stages decreases charging efficiency and is a limiting factor in the obtainable voltage from accelerators of the type shown in FIG. 1. The features of the invention that provide linear voltage increases in the axial and radial directions are described below concerning FIGS. 5, 6 and 7.

Figure 5:
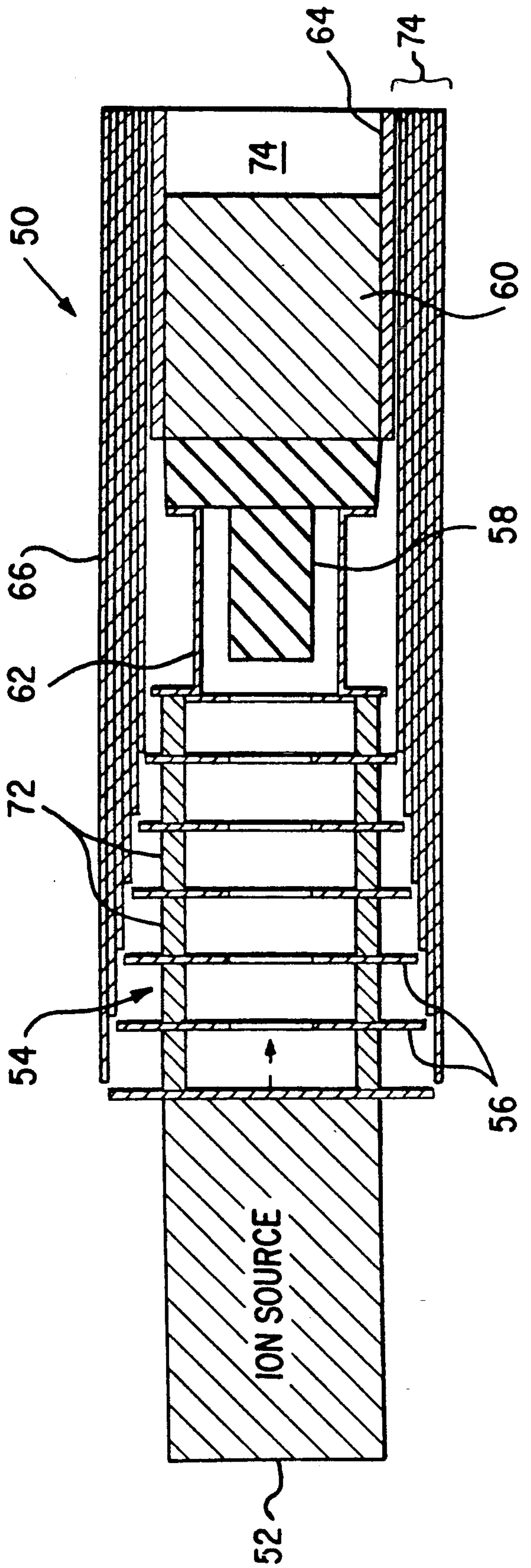
FIG. 5 is a detail of FIG. 4.

FIG. 5 is a detail of FIG. 4 and shows the layers comprising the DC capacitor bank 66. The acceleration tube 54 comprises 7 axially arranged rings 56 of Kovar, for example. DC capacitor bank 66 substantially surrounds rings of the acceleration tube 54. Each ring connects to a corresponding single capacitor of the DC capacitive bank 66 such that an innermost ring connects to the innermost foil. The rings 56 are biased by successively higher voltages from the DC capacitor bank 66 such that the highest voltage is generated at the smallest, innermost ring. In this manner, particles from the source 52 are accelerated toward the target 58. In the case of a neutron generator, the source 52 is an ion source, in the case of an x-ray, the source 52 is an electron gun. The rings 56 of the acceleration tube 54 and the particle source 52 are connected together by ceramic insulators 72. A bracket 62 secures the cermaic insulators 72 and the rings 56 in place relative to the target 58.

The target 58 is copper and is coated on its face with titanium in the case of a neutron generator, and is covered with a tungsten button in the case of an x-ray generator. The target 58 connects to the brass plug 60, which seals one end of the non-conductive tube 64. A liquid dielectric 74, such as Fluorinert, provides cooling, high voltage insulation, fills any gaps in the capacitors of either the DC or AC capacitor banks 66, 70, and increases capacitance values of the layers of each bank. The entire particle accelerator 50 is typically surrounded by Fluorinert that is contained in a housing. Since no high voltage appears exterior to the particle accelerator 50 (other than the AC voltage required to excite the AC bank), insulation requirements between the accelerator and housing are modest. The DC capacitor bank 66, and the AC capacitor bank 70, comprise layers of radially arranged capacitors. The capacitors of each bank 66 or 70 connect in series.

Figure 6:
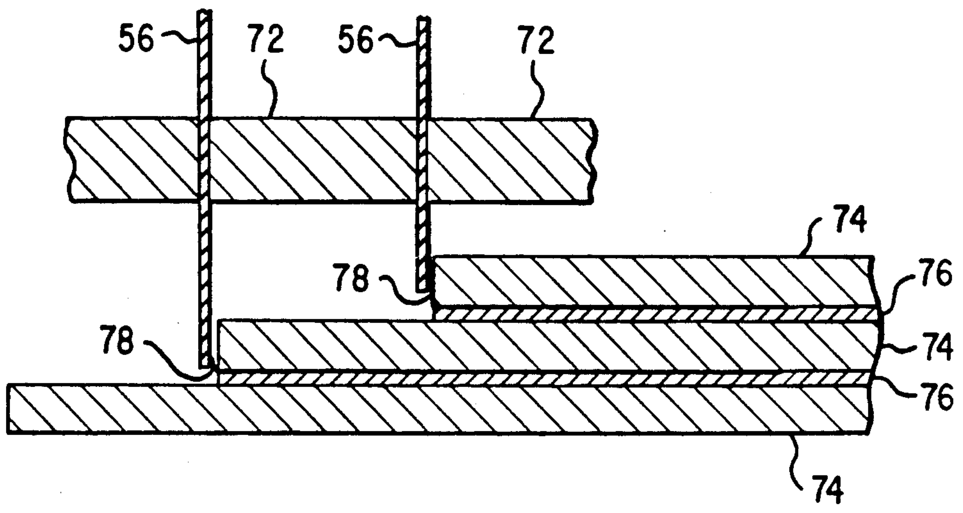
FIG. 6 is a detail of FIG. 5.

FIG. 6 illustrates only three stages of a six-stage device comprising six capacitors 74 for simplicity. The voltage produced by each stage is approximately 30 kV. However, the six capacitors 74 comprise four turns of one 0.002" thick sheet of insulating material, such as FEP Teflon, Kapton, or polyphenyl sulfide, for example, which has been rolled, and between which copper foils 76 comprising electrodes of each capacitor 74 are sandwiched. Each copper foil 76 is 0.0015" thick. Fine, 0.008" diameter nickel wires 78 connect the copper foils of each capacitor 74 to a corresponding single ring 56 of the acceleration tube 54.

Figure 7:
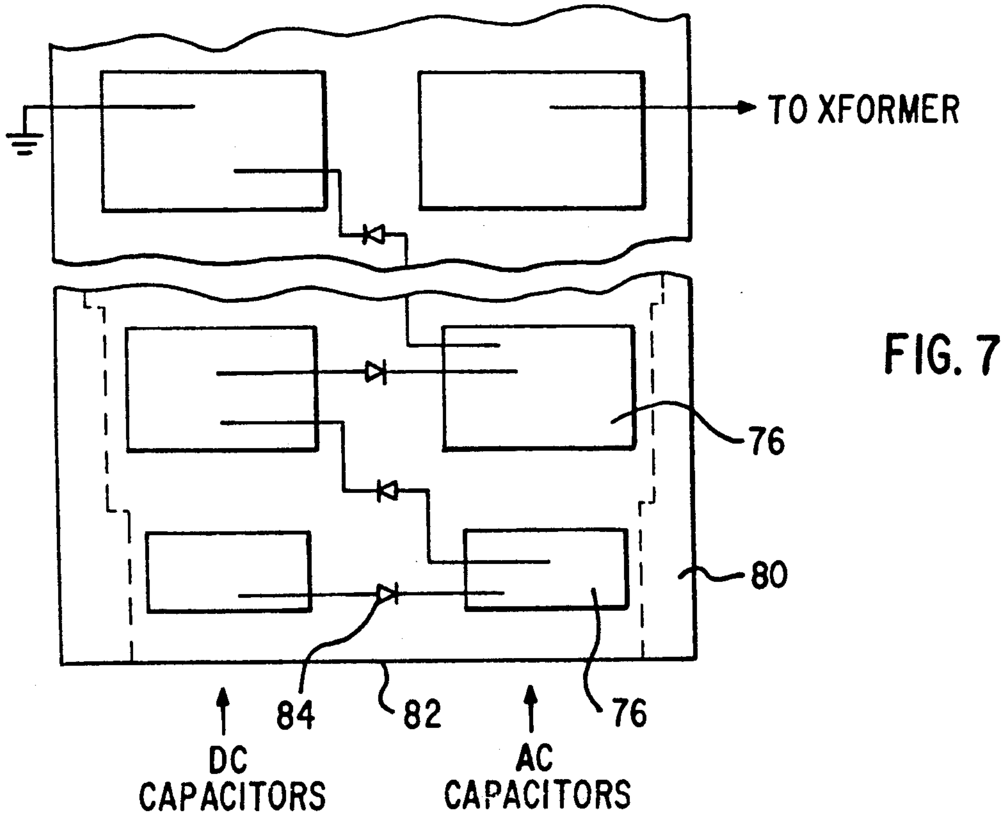
FIG. 7 illustrates how the particle accelerator of FIG. 4 is made.

FIG. 7 illustrates how the voltage multiplier of the particle accelerator 50 of FIG. 4 is made. Basically, the voltage multiplier comprises a sheet of insulation, smaller conductive copper foils, and diodes, which are layered together and then rolled onto the non-conductive tube 64. As each stage is rolled, the insulation is trimmed, as shown by the dashed line. The copper foils comprise electrodes of the capacitors and the sheet comprises a dielectric material between the electrodes.

Copper foils 76 are placed on a sheet 80 of insulating material such as FEP Teflon. Each copper foil 76 comprises an electrode of a capacitor of the banks 66 and 70. The size and spacing of the foils 76 are determined according to their placement on the sheet 80. Foils 76 closest to the end 82 are smallest and those foils 76 at the opposite end are the largest. The foils 76 have different sizes and are arranged in increasing size such that an innermost foil is the smallest foil. The spacing between successive pairs of foils 76 increases from the end 82. The sheet of insulation is arranged to have an increasing axial length such that an innermost portion of the sheet has the smallest axial length.

Commercially available diodes 84 are then placed on the sheet 80 so leads of the diodes contact foils 76. A mandrel (not shown) is then placed at the end 82, and the sheet 80, with the copper foils 76 and diodes 84, is rolled onto the mandrel. The mandrel is plastic, for example, and comprises the non-conductive tube 64 of FIG. 4. The mandrel provides structural support to the now radially arranged capacitors. The diameter of the resulting assembly increases as the sheet is rolled onto the mandrel. Thus, the spacing between and the size of the copper foils are greater toward the opposite end to compensate for the increase in circumferential area that occurs as the diameter of the assembly increases. The inventor has found that no solder connections between the copper foils 76, insulating sheet 80 or diodes 84 are necessary. Electrostatic forces are sufficient to squeeze the layers of foil and insulating sheet together and maintain electrical contact when the particle accelerator 50 is operated.

For the DC bank, the last copper layer is ground and functions as the plate of the first capacitor. The metal foils function as plates of the succeeding capacitors. The axial length of the metal shields decreases as one goes radially inward. This makes the leakage path to grounds longer, and greatly reduces stray capacitance to ground and stray capacitance from the AC plates to the DC plates. The axial length of each capacitor bank is 16 inches minimum to provide sufficient capacitance to give acceptable charge transfer for a ladder load of 400 μA. The length of each capacitor would need to be adjusted for different ladder loads.

The six-stage acceleration tuve of this invention is capable of at least 180 kV operation in a 2" ID grounded housing. A ten-stage acceleration tube would provide 300 kV. By using two power supplies of opposite polarity, operation of an x-ray or neutron tube at 600 kV should be possible.

In a given capacitor bank, the capacitance at the inside of the bank is smaller than that at the outside of the bank, because of length variations. The overall length of the capacitors is set by the required minimum capacitance, which depends on the load current, the driving frequency and stray capacitances. Experience with ladder simulations has shown that for driving frequencies above 1 kHz, load currents of 500 μA or less and for practical stray capacitances, a minimum capacitance (for each capacitor in a string) of 2 nf is acceptable for ladders up to 10 stages.

The capacitors are formed from cylindrical electrodes with insulating cylinders interposed. The innermost (highest voltage) electrode is mated to the target 58 by the bracket 62 such that the face of the target 58 is recessed from that electrode. In this way, there is essentially no radial electric field at the target surface. Each electrode extends farther toward the ion source 26 (i.e., axially) than its smaller radius neighbor. By properly choosing the axial extent of the electrodes, the high radial electric field between the electrodes is transformed into an essentially linear axial field in the beam and target region.

Figure 8:
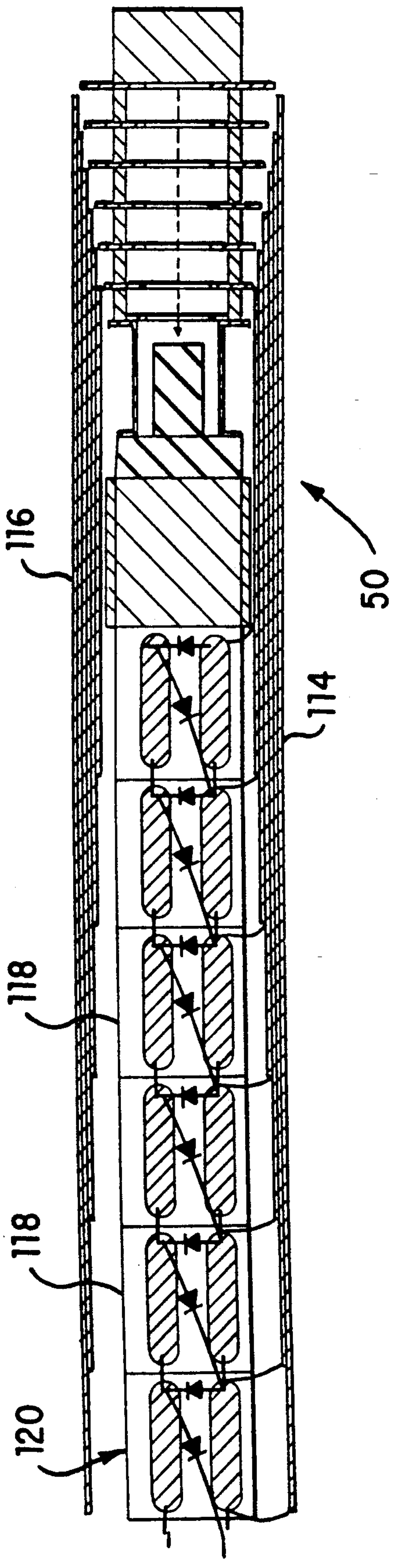
FIG. 8 is a schematic diagram of another particle accelerator according to this invention.

FIG. 8 is a schematic diagram of another particle accelerator 50 according to this invention. In this embodiment, the acceleration tube 54 is constructed and the rings 56 are attached to electrodes 114 of a radially arranged series capacitor bank 116 as per the previous embodiment, but the electrodes 114 of the capacitor bank 116 are electrically connected to stages 118 of a Cockcroft-Walton voltage multiplier 120 of conventional inline construction. This invention has many of the advantages of the first embodiment since both the axial and radial electric fields can be made linear by proper spacing of the acceleration tube rings 56 and radial capacitors 116, respectively. Also essentially no high voltage is present at the surface of the device, providing very modest insulation requirements. A disadvantage of this embodiment compared to the first, however, is the higher capacitance from the AC side to the DC side, with a correspondingly poorer charge transfer efficiency.

Figure 9:
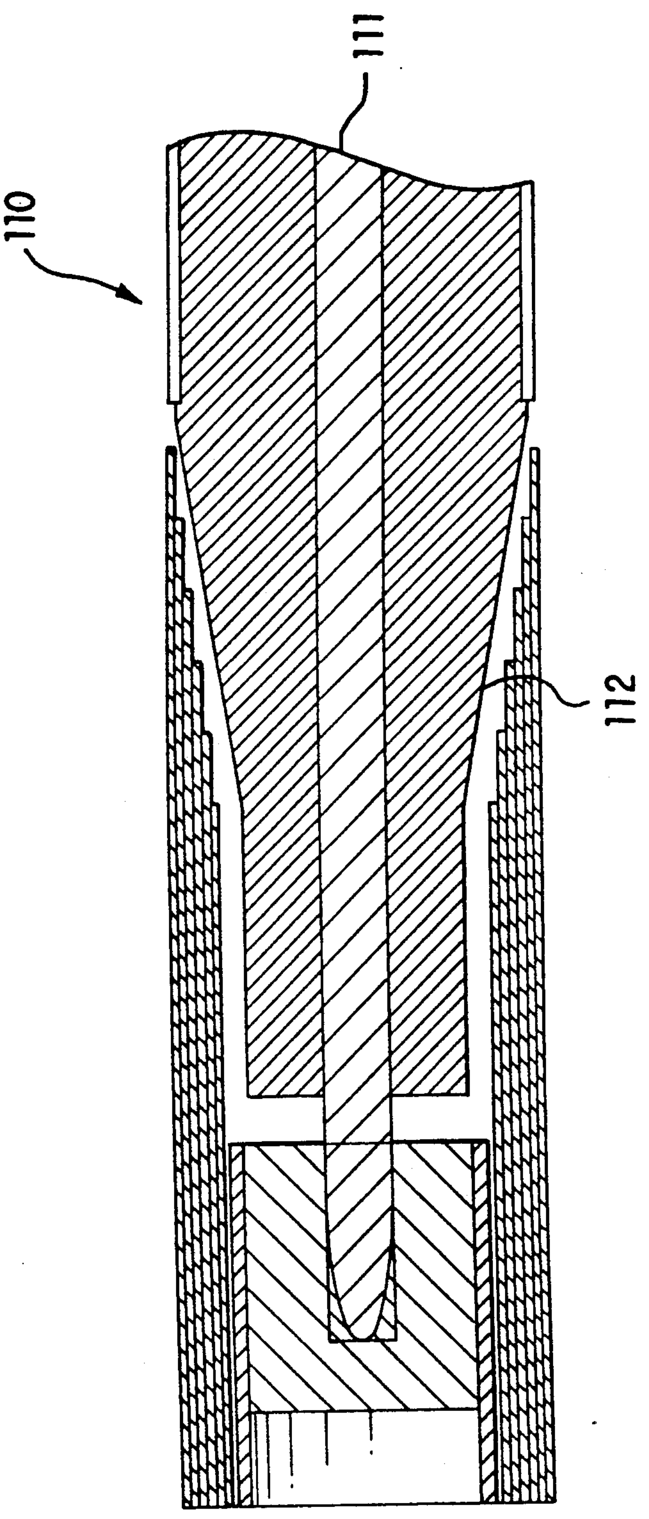
FIG. 9 is a schematic diagram of a power supply according to this invention.

FIG. 9 is a schematic diagram of a power supply according to this invention. If the acceleration tube is replaced by a high voltage connector and cable, as shown in FIG. 9, the Cockcroft-Walton voltage multiplier as described in the previous embodiment of the invention can be used as a stand-alone high voltage power supply. A coaxial high voltage cable 110 terminates in a high voltage connector consisting of a central conductor 111 and a cone shaped insulator 112. The invention is inherently more compact than conventional Cockcroft-Walton high voltage power supplies because no voltages higher than the exciting voltage are present on the outside of the device, leading to lower insulation requirements. The Cockcroft-Walton power supply can also comprise coaxial tubes instead of one rolled sheet of insulation. In either case, alternating layers of insulation and conductors are provided, as viewed in cross-section.

EXAMPLE

A 5-stage Cockcroft-Walton generator was built as follows. Foils were cut from 0.0014" thick Cu stock. Two foils each of lengths 10", 10.5", 11", 11.5", 12", and 12.5", and width 7.5" were cut. The shortest two foils were placed on a 0.002" thick, 48" wide FEP Teflon film, 8" apart. Lead extensions were soldered to Amperex BY714 diodes (2 in series) and the diode assembly was placed on the Cu foils and Teflon film as described previously. A 1" diameter polycarbonate rod was used for the winding mandrel. After winding approximately 1 turn, the second diode assembly (which connects the highest voltage AC capacitor to the next highest DC capacitor was laid in place. The Teflon film was wound approximately 5 more turns before the next pair of Cu foils was placed into position. This provided four layers of 0.002" thick Teflon to form the capacitor dielectric layer. At this point, the Teflon film already rolled was trimmed to the proper length, and the next capacitor stage was rolled. Because the diodes are approximately 0.1" in diameter, some air gaps are unavoidable between the Teflon layers of the capacitor dielectric. After winding, leads to be connected to the HV transformer were soldered to the outermost Cu layers of the AC and DC capacitor banks. The entire assembly, approximate 1.4" in diameter, was loaded into a 2" diameter polycarbonate housing, evacuated, and backfilled with FC5311 Fluorinert. The liquid was then pressurized to 25 psia. with $SF_6$. Tests with a 2 GΩ load and 10 kHz driving frequency indicated output voltage near 100% of the maximum possible (ten times the peak AC driving voltage). The voltage generator operated satisfactorily up to and including 16 kV peak AC driving voltage, for a DC voltage generation of approximately 160 kV.

A second device of similar construction but with 12 stages, operated satisfactorily up to and including 25 kV peak excitation voltage, providing approximately 300 kV DC.

MODIFICATIONS

The capacitor banks are biased with a negative polarity to accelerate positive ions for neutron generation, and with a positive polarity for x-ray generation. A tandem approach is also possible. In this case, the source generates negative ions, which are accelerated to a voltage V. A carbon foil strips away the electrons to produce a positive charge. The positive charge is then accelerated through a symmetric system to ground. Wire grids over apertures in the rings of the acceleration tube could be used to focus the accelerated particles onto the target.

I claim:

1. An apparatus comprising:

a means for supplying a voltage signal; and a Cockcroft-Walton voltage multiplier that multiplies the voltage signal and includes a bank of radially arranged capacitors, the capacitors having layers which are substantially tubular and comprise an outer capacitor and at least one inner capacitor, such that the inner capacitor is nested within and surrounded by the outer capacitor.

2. The apparatus of claim 1, such that voltage exterior to the apparatus is no greater than the signal voltage.

3. The apparatus of claim 2, wherein the bank of capacitors is a tubular member comprising a sheet of insulation and foils; the foils comprise electrodes of the capacitors; and the sheet comprises a dielectric material between the electrodes.

4. The apparatus of claim 3, the foils having different surface areas and arranged in the tubular member in increasing area such that an innermost foil is the smallest foil.

5. The apparatus of claim 4, the sheet of insulation arranged in the tubular member to have an increasing axial length such that an innermost portion of the sheet has the smallest axial length.

6. The apparatus of claim 5, the bank of capacitors comprising a DC capacitor bank and an AC capacitor bank, the Cockcroft Walton voltage multiplier also including a bank of diodes that connects the AC capacitor bank and the DC capacitor bank.

7. The apparatus of claim 6, wherein the diodes of the diode bank and the foils of the AC and DC capacitor banks are physically connected by electrostatic forces to conduct electrically.

* * * * *